US012614947B2

(12) United States Patent
Puiu et al.

(10) Patent No.: US 12,614,947 B2
(45) Date of Patent: Apr. 28, 2026

(54) AXIAL BRUSH ASSEMBLY FOR ELECTRIC MACHINE

(71) Applicant: GM GLOBAL TECHNOLOGY OPERATIONS LLC, Detroit, MI (US)

(72) Inventors: Dumitru Puiu, Sterling Heights, MI (US); Mazharul Chowdhury, Canton, MI (US); Mohammad F. Momen, Rochester Hills, MI (US); Khorshed Mohammed Alam, Canton, MI (US); Muhammad A. Zahid, Troy, MI (US); Yilun Luo, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 333 days.

(21) Appl. No.: 18/483,166

(22) Filed: Oct. 9, 2023

(65) Prior Publication Data

US 2025/0119021 A1     Apr. 10, 2025

(51) Int. Cl.
H02K 5/14          (2006.01)
H01R 39/26         (2006.01)

(52) U.S. Cl.
CPC ............. H02K 5/141 (2013.01); H01R 39/26 (2013.01)

(58) Field of Classification Search
CPC ....... H02K 5/141; H02K 13/003; H01R 39/26
See application file for complete search history.

(56) References Cited

U.S. PATENT DOCUMENTS 3,984,716 A * 10/1976 Stark ................... H02K 13/003
                                                310/227

6,012,563 A * 1/2000 Aoki ...................... F16D 27/06
                                                310/248
6,469,414 B2 * 10/2002 Rehder ................... H01F 38/18
                                                310/129
8,525,383 B2 * 9/2013 Kikuichi ............... H02K 13/02
                                                310/128
2016/0372880 A1 * 12/2016 Minami ................ H01R 39/64

FOREIGN PATENT DOCUMENTS

DE          4333094 A1     3/1995
DE     102014225216 A1     6/2016
DE     102016200766 A1     7/2017
DE     102019206880 A1     12/2019

OTHER PUBLICATIONS

German Office Action dated Jun. 3, 2024.

* cited by examiner

*Primary Examiner* — Tulsidas C Patel
*Assistant Examiner* — Mohammed Ahmed Qureshi
(74) *Attorney, Agent, or Firm* — Quinn IP Law

(57)          ABSTRACT

A rotor assembly includes a rotor shaft and a rotor core supported by the rotor shaft and surrounded by a plurality of windings. The rotor assembly also includes a first brush engaging a first slip ring fixed relative to a first distal end of the rotor shaft. The first brush includes one of a first conical projection or a first convex receptacle and the first slip ring includes the other of the first conical projection or the first convex receptacle. A first electrical connection extends between the first slip ring and the plurality of windings. A second brush is configured to engage a second slip ring with the second slip ring fixed relative to the rotor shaft. A second electrical connection extending between the second slip ring and the plurality of windings.

20 Claims, 7 Drawing Sheets

AXIAL BRUSH ASSEMBLY FOR ELECTRIC MACHINE

INTRODUCTION

Electric motors are used in a wide range of applications, from operating small electro-mechanical devices, to providing a primary propulsion source for vehicles. An electric motor can include a stator that is fixed within a housing that causes a rotor to spin relative to the stator. In example, the stator may include magnetics that rotor in response to an electric field generated by a stator. In another example, the rotor includes windings surrounding a rotor core that are separately excitable to cause the rotor to spin in response to the electric field generated by the stator. The windings are excitable by applying an electrical voltage to the rotor windings through brushes engaging corresponding slip rings on the rotor shaft.

SUMMARY

Disclosed herein is a rotor assembly for an electric machine. The rotor assembly includes a rotor shaft and a rotor core supported by the rotor shaft and surrounded by a plurality of windings. The rotor assembly also includes a first brush engaging a first slip ring fixed relative to a first distal end of the rotor shaft. The first brush includes one of a first conical projection or a first convex receptacle and the first slip ring includes the other of the first conical projection or the first convex receptacle. A first electrical connection extends between the first slip ring and the plurality of windings. A second brush is configured to engage a second slip ring with the second slip ring fixed relative to the rotor shaft. A second electrical connection extending between the second slip ring and the plurality of windings.

Another aspect of the disclosure may be where the first brush is located in a first brush housing and the first brush is biased towards the first slip ring with a first spring element.

Another aspect of the disclosure may be where the rotor shaft includes an internal passageway with at least one internal conduit configured to accept at least one of the first electrical connection or the second electrical connection.

Another aspect of the disclosure may be where the at least one internal conduit is comprised of a non-conductive material.

Another aspect of the disclosure may be where at least one of the first electrical connection and the second electrical connection include a plurality of connections to the plurality of windings.

Another aspect of the disclosure may be where the second brush includes one of a second conical projection or a second convex receptacle configured to engage the other of the second conical projection or the second convex receptacle on the second slip ring and the second brush is located in a second brush housing. The second brush is biased towards the second slip ring with a second spring element.

Another aspect of the disclosure may include a first bearing current bypass brush fixed relative to the first brush housing with the first bearing current bypass brush located radially outward from the first brush. A first bearing current bypass slip ring is fixed relative to the first axial end of the rotor shaft and located radially outward of the first slip ring. The first bearing current bypass brush is connected to an electrical ground.

Another aspect of the disclosure may be where the second brush extends circumferentially, and the second slip ring extends circumferentially, and the second brush is located radially outward from the second slip ring.

Another aspect of the disclosure may be where the first slip ring and the second slip ring are located on the same axial side of the rotor shaft relative to the rotor core.

Another aspect of the disclosure may be where a wire gauge of the first electrical connection varies relative to a wire gauge of the second electrical connection.

Another aspect of the disclosure may be where the second electrical connection includes a plurality of connections to the plurality of windings.

Another aspect of the disclosure may be where one of the first or second electrical connections is located adjacent to an exterior of the rotor shaft and the other of the first or second electrical connections is located in an interior of the rotor shaft.

Another aspect of the disclosure may include a first bearing current bypass brush fixed relative to the first brush housing with the first bearing current bypass brush located radially outward from the first brush. A first bearing current bypass slip ring fixed relative to a first axial end of the rotor shaft and located radially outward of the first slip ring. The first bearing current bypass brush is configured to connect to an electrical ground.

Another aspect of the disclosure may be where the rotor shaft includes an internal cooling passageway with the second brush being located radially outward and at least partially axially aligned with the first brush. The second slip ring is located axially outward and at least partially axially aligned with the second slip ring.

Disclosed herein is an electric machine. The electric machine includes a stator having a plurality of stator windings and a rotor shaft supporting a rotor core surrounded by a plurality of rotor windings, a first brush is configured to engage a first slip ring fixed relative to a first distal end of the rotor shaft. The first brush includes one of a first conical projection or a first convex receptacle and the first slip ring includes the other of the first conical projection or the first convex receptacle. A first electrical connection extends between the first slip ring and the plurality of rotor windings. A second brush is configured to engage a second slip ring with the second slip ring fixed relative to the rotor shaft. A second electrical connection extends between the second slip ring and the plurality of rotor windings.

Disclosed herein is a vehicle. The vehicle includes a body defining a passenger compartment and an electric motor supported in the body. The electric motor includes a stator having a plurality of stator windings and a rotor shaft supporting a rotor core surrounded by a plurality of rotor windings. A first brush is configured to engage a first slip ring fixed relative to a first distal end of the rotor shaft. The first brush includes one of a first conical projection or a first convex receptacle and the first slip ring includes the other of the first conical projection or the first convex receptacle. A first electrical connection extends between the first slip ring and the plurality of rotor windings. A second brush is configured to engage a second slip ring with the second slip ring fixed relative to the rotor shaft. A second electrical connection extends between the second slip ring and the plurality of rotor windings.

BRIEF DESCRIPTION OF THE DRAWINGS

One or more embodiments will now be described, by way of example, with reference to the accompanying drawings, in which.

DETAILED DESCRIPTION

Figure 1:
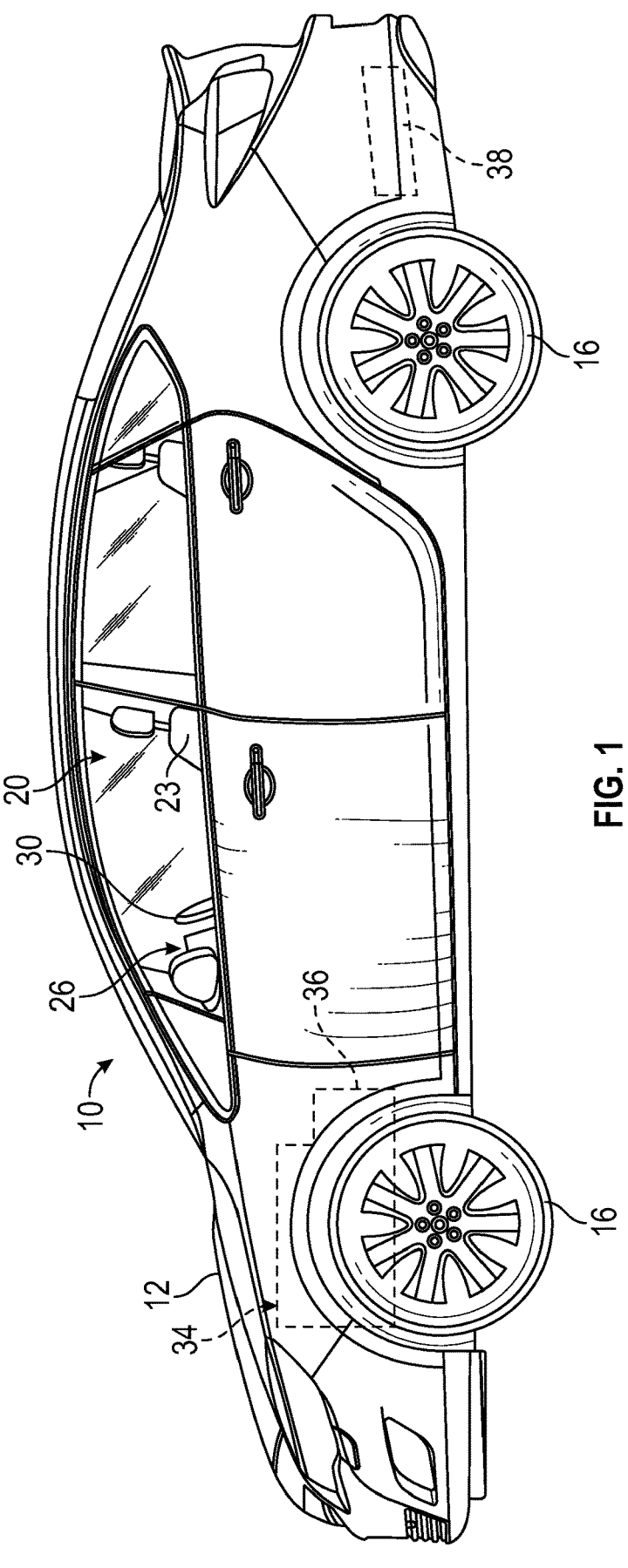
FIG. 1 schematically illustrates a vehicle.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a plurality of wheels 16. One or more of the plurality of wheels 16 are steerable. Body 12 defines, in part, a passenger compartment 20 having seats 23 positioned behind a dashboard 26. A steering control 30 is arranged between seats 23 and dashboard 26. Steering control 30 is operated to control orientation of the steerable wheel(s).

Vehicle 10 includes an electric machine, such as an electric motor 34, connected to a transmission 36 that provides power to one or more of the plurality of wheels 16. A rechargeable energy storage system (RESS) 38 is arranged in body 12 and provides power to electric motor 34. At this point, it should be understood that the location of electric motor 34, transmission 36, and RESS 38 in body 12 may vary.

Figure 2:
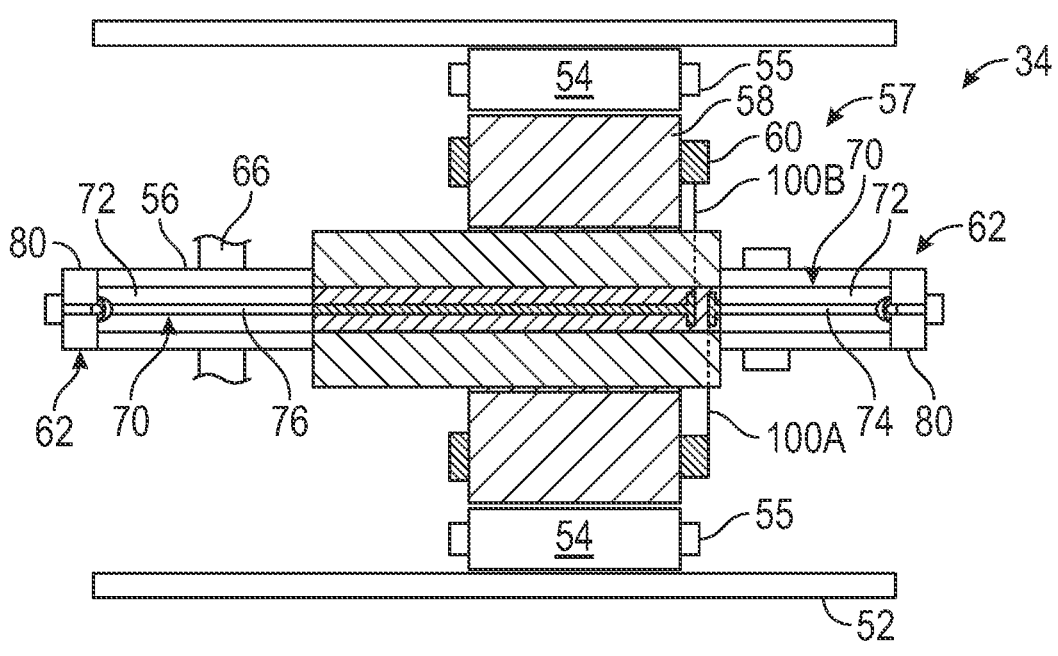
FIG. 2 schematically illustrates a cross-sectional view of an electric motor incorporated into the vehicle of FIG. 1.

FIG. 2 illustrates a cross-sectional view of the electric motor 34 for FIG. 1. In the illustrated example, the electric motor 34 includes a housing 52 that at least partially encloses a stator 54 and a rotor assembly 57. The rotor assembly 57 includes at least a rotor core 58 fixed to the rotor shaft 56 with a plurality of windings 60. The plurality of windings 60 are excited through first and second brush assemblies 62 located on opposing axial ends of the rotor shaft 56. The stator 54 includes a plurality of winding 55 for creating an electric field to induce rotation of the rotor shaft 56. A gear 66 can be attached to the rotor shaft 56 to provide an output for the electric motor 34.

In the illustrated example, the electric motor 34 is a separately excited electric motor with the plurality of windings 60 through which electric current is run to generate a magnetic field and induce rotation of the rotor shaft 56 relative to the stator 54. One feature of the electric motor 34, being a separately excited motor, is the ability minimize electrical losses by controlling the magnetic field in the plurality of windings during operation.

Figure 3:
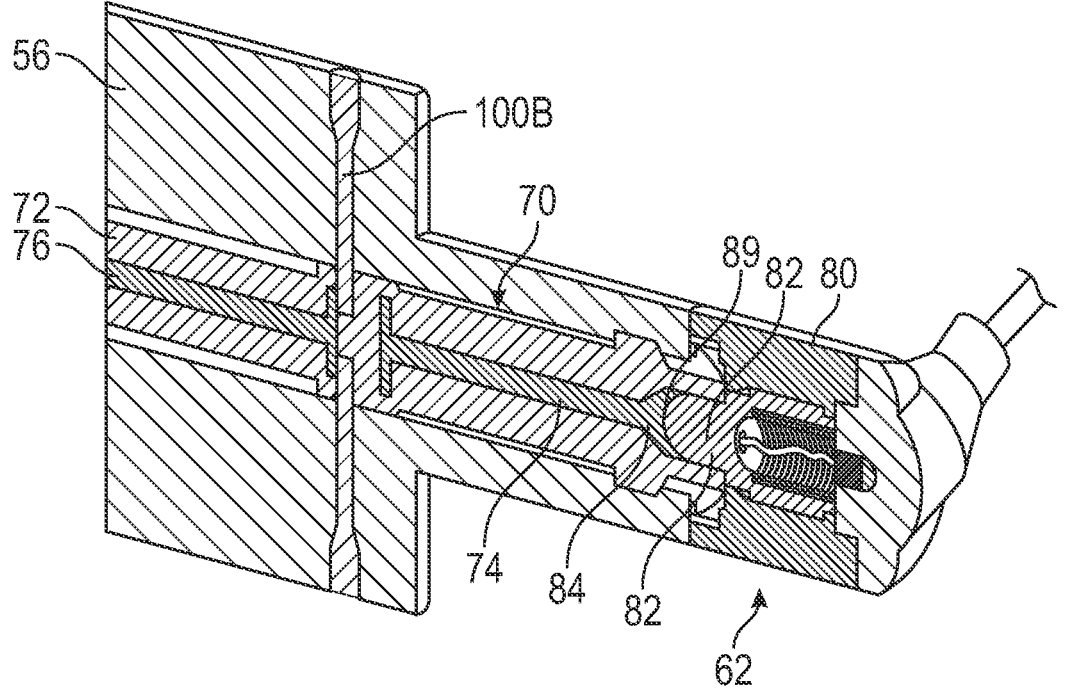
FIG. 3 illustrates an enlarged view of an example brush assembly with an example slip ring on a rotor shaft of the electric motor of FIG. 2.

As shown in FIGS. 2-3, the rotor shaft 56 includes an internal passageway 70 for accepting an electrical conduit 72 comprised of a non-conductive material. The electrical conduit 72 includes at least a portion of a first electrical connection 74 extending between a first brush assembly 62 and the plurality of windings 60 and a second electrical connection 76 extending between a second brush assembly 62 and the plurality of windings 60. In the illustrated example, the first and second electrical connections 74, 76 have opposite polarities, such as the first electrical connection 74 having a positive charge and the second electrical connection 76 having a negative charge.

Figure 4:
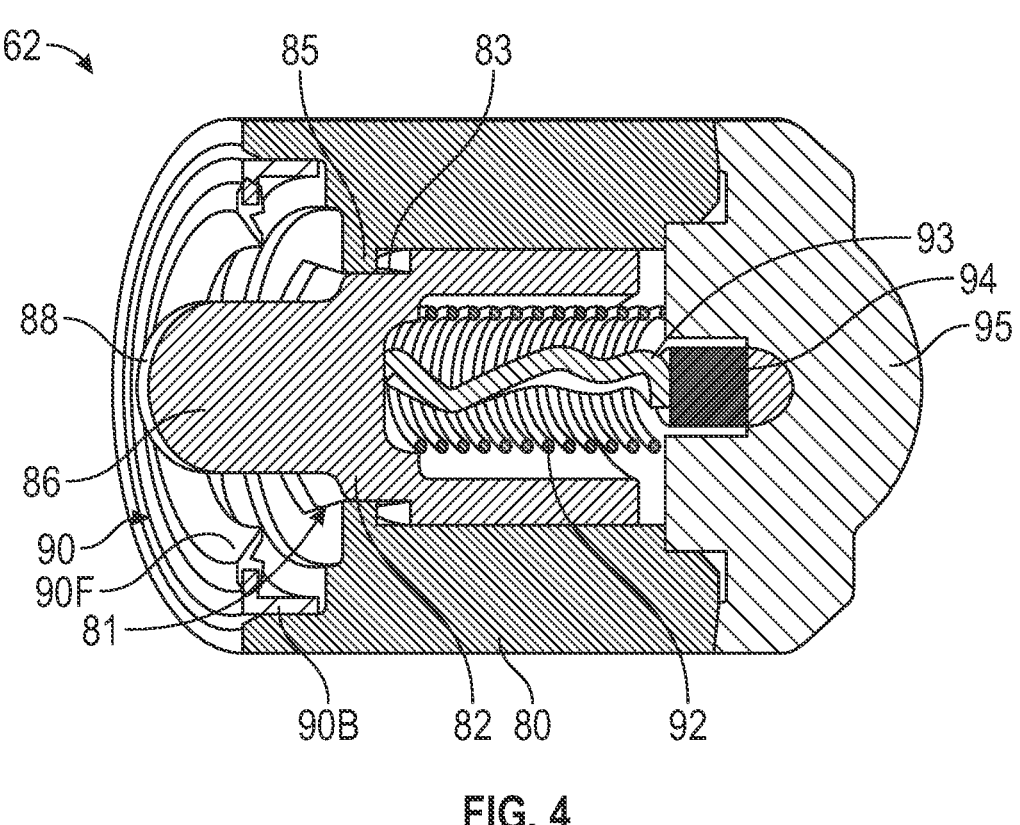
FIG. 4 is a cross-sectional view of the brush assembly shown in FIG. 2.

As shown in FIGS. 2-4, the first and second brush assembly 62 each include a brush housing 80 at least partially enclosing a brush 82 for engaging a slip ring 84 and fixed from rotating relative to the rotor shaft 56. In the illustrated example, the brush 82 includes a projection 86 having a conical distal end 88 that extends through a central brush opening 81 in the brush housing 80 to engage a convex receptacle 89 on the slip ring 84. One feature of the conical distal end 88 engaging the convex receptacle 89 is increased surface contact between the brush 82 and the slip ring 84 for forming an electrical connection.

The brush 82 is biased towards the slip ring 84 by a biasing element 92, such as a spring or elastomer. The brush 82 is keyed relative to the brush housing 80 to prevent the brush 82 from rotating relative to the brush housing 80. In the illustrated example, the keyed connection includes a flat or ledge 83 on the brush 82 that mates with a corresponding flat or ledge 85 on the brush housing 80.

Because the brush 82 is biased and can move along a central longitudinal axis through the brush housing 80, an extendable connector 93 extends from an electrical connection 94 in an electrical connector 95 and the brush 82 to maintain an electrical connection while the brush 82 moves in the brush housing 80. The extendable connector 93 can include a conductive wire having sufficient length to engage both the brush 82 and the electrical connection 94 through the full travel of the brush 82. The extendable connector 93 can be fixed to both the brush 82 and the electrical connection 94. Alternatively, the extendable connector 93 can be fixed to just one of the brush 82 or the electrical connection 94 and biased against the other of the brush 82 or the electrical connection 94.

A seal 90 is located adjacent to the brush opening 81 and fixed relative to the brush housing 80. The seal 90 is configured to slidably engage at least one of the rotor shaft 56 or the electrical conduit 72 to create a seal. In the illustrated example, seal 90 extends circumferentially to form a complete ring to prevent debris or lubricant from entering the connection between the brush 82 and the slip ring 84. The seal 90 includes a base portion 90B that engages the brush housing 80 on a radially outer side relative to the central longitudinal axis of the brush opening 81. A flange 90F extends radially inward from the base portion 90B of the seal 90 and is comprised of a polymer, such as rubber.

Figure 5:
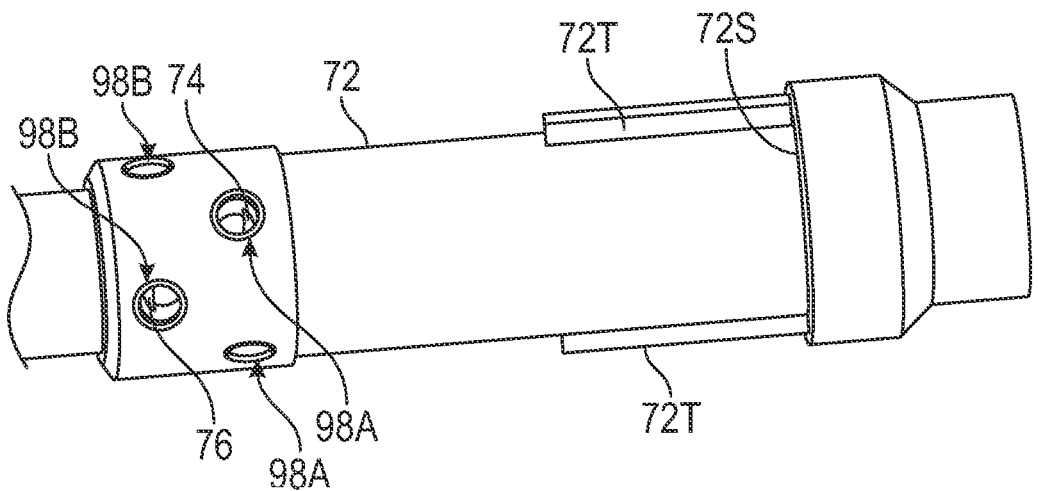
FIG. 5 illustrates a perspective view of a portion of an electrical conduit.

As shown in FIGS. 3 and 5, the first and the second electrical connections 74, 76 extend radially from the electrical conduit 72 at one of a plurality of first or second junction 98A, 98B, respectively, to form the electrical connection with the plurality of windings 60. The first and second electrical connections 74, 76 can each include multiple connections with the plurality of windings 60 through a corresponding one of the plurality of first and second junctions 98A, 98B. The electrical conduit 72 includes at least one tab 72T and a stop surface 72S that interfaces with the rotor shaft 56 to assist in preventing the electrical conduit 72 from moving relative to the rotor shaft 56 to align the first and second junctions 98A, 98B with openings in the rotor shaft 56 to connect with the plurality of windings 60.

One feature of having multiple connections between the first and second electrical connections 74, 76 and the plurality of windings 60 is increased reliability. In particular, the multitude of connections ensures that the plurality of windings 60 remain in contact with the first and second electrical connections 74, 76 if one of the multitude of connections fails. As shown in FIGS. 2-3, first jumpers 100A extend from corresponding ones of the first junctions 98A to the plurality of windings and second jumpers 100B extend between the second junctions 98B and the plurality of windings 60.

As shown in FIGS. 3 and 5, the first and second electrical connections 74, 76 each connect to first and second jumpers 100A, 100B, respectively, with a connection, such as a snap connection, when the first and second jumpers 100A, 100B are inserted into the rotor shaft 56 and into corresponding first and second junctions 98A, 98B in the electrical conduit 72.

Furthermore, the length of the first and second electrical connections 74, 76 can vary due to packaging constraints. To compensate for this variation in length, the first electrical connection 74 can include a different gauge of wire than the second electrical connection 76 to compensate for the variations in internal resistance that can occur due to the different lengths.

Figure 6:
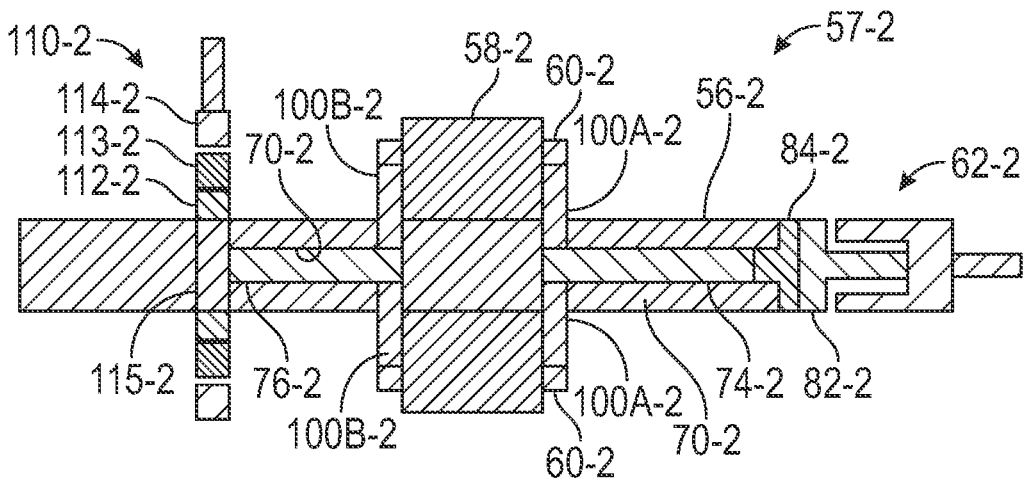
FIG. 6 schematically illustrates another example rotor assembly.

FIG. 6 schematically illustrates another example rotor assembly 57-2. The rotor assembly 57-2 is similar to the rotor assembly 57 except where shown in the drawings or described below. The rotor assembly 57-2 includes a rotor shaft 56-2 having an internal passageway 70-2 for accepting a first electrical connection 74-2 and a second electrical connection 76-2. The internal passageway 70-2 can be continuous or discontinuous.

The first electrical connection 74-2 connects a plurality of windings 60-2 surrounding a rotor core 58-2 to a brush assembly 62-2. The brush assembly 62-2 includes a brush housing 80-2 at least partially enclosing a brush 82-2 for engaging a slip ring 84-2 that is fixed from rotating relative to the rotor shaft 56-2.

The second electrical connection 76-2 connects a radial brush assembly 110-2 to the plurality of windings 60-2. In the illustrated example, the radial brush assembly 110-2 is located radially outward from the radial slip ring 112-2 and includes a radial brush 113-2 fixed relative to a brush housing 114-2. The radial slip ring 112-2 also includes at least one radial connection 115-2 to connect with the second electrical connection 76-2.

Also, the first and second electrical connections 74-2, 76-2 include one or more jumpers 100A-2, 100B-2 extending between the plurality of windings 60-2 and the first and second electrical connections 74-2, 76-2, respectively. The first and second electrical connections 74-2, 76-2 can be equal in axial length due to the use of the radial brush assembly 110-2 with a radial slip ring 112-2 fixed relative to the rotor shaft 56-2 and in electrical connection with the plurality of windings 60-2. For simplicity, the internal conduit is not illustrated with the first and second electrical connections 74-2 and 76-2.

Figure 7:
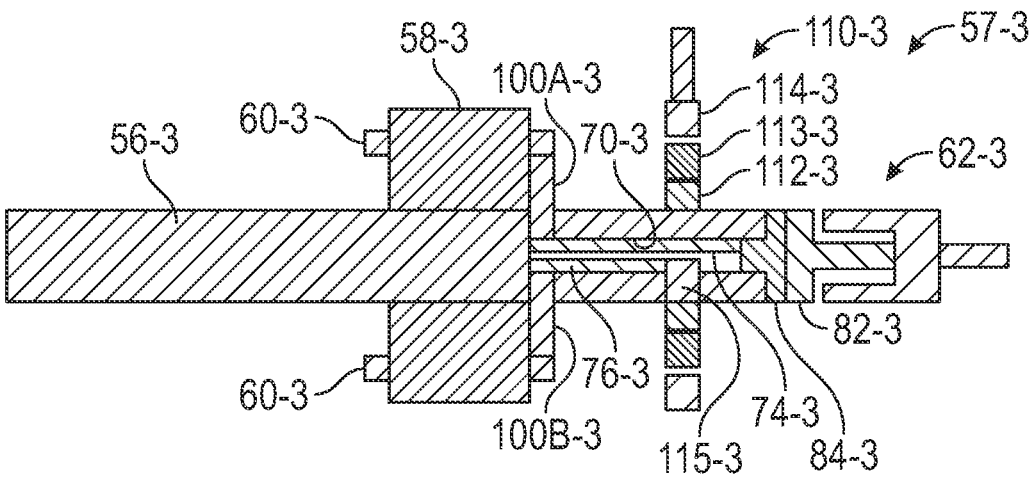
FIG. 7 schematically illustrates yet another example rotor assembly.

FIG. 7 schematically illustrates another example rotor assembly 57-3. The rotor assembly 57-3 is similar to the rotor assembly 57 except where shown in the drawings or described below. The rotor assembly 57-3 includes a rotor shaft 56-3 having an internal passageway 70-3 for accepting a first electrical connection 74-3 and a second electrical connection 76-3. In the illustrated example, the first and second electrical connections overlap with each other relative to a central longitudinal axis of the rotor shaft 56-3.

The first electrical connection 74-3 connects a plurality of windings 60-3 surrounding a rotor core 58-3 to a brush assembly 62-3. The brush assembly 62-3 includes a brush housing 80-3 at least partially enclosing a brush 82-3 for engaging a slip ring 84-3 fixed from rotating relative to the rotor shaft 56-3.

The second electrical connection 76-3 connects a radial brush assembly 110-3 to the plurality of windings 60-3. In the illustrated example, the radial brush assembly 110-3 is located radially outward from a radial slip ring 112-3 and includes a radial brush 113-3 fixed relative to a brush housing 114-3. The radial slip ring 112-3 also includes at least one radial connection 115-3 to connect with the second electrical connection 76-3.

Also, the first and second electrical connections 74-3, 76-3 can include one or more jumpers 100A-3, 100B-3 extending between the plurality of windings 60-3 and the first and second electrical connections 74-3, 76-3, respectively.

Also, the first and second electrical connections 74-3, 76-3 include varying axial lengths due to the use of the radial brush assembly 110-3 with a radial slip ring 112-3 fixed relative to the rotor shaft 56 on the same axial side of the plurality of windings. Therefore, a gauge of the wire used for the first and second electrical connections 74-3, 76-3 varies to accommodate for the varying internal resistance. For simplicity, the internal conduit is not illustrated with the first and second electrical connections 74-3 and 76-3.

Figures 8, 9:
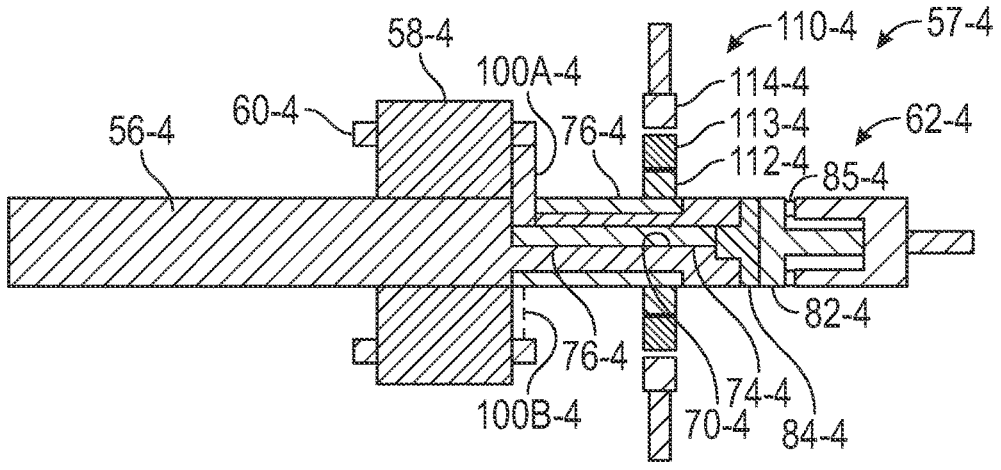
FIG. 8 schematically illustrates yet another example rotor assembly.
FIG. 9 schematically illustrates yet another example rotor assembly.

FIG. 8 schematically illustrates another example rotor assembly 57-4. The rotor assembly 57-4 is similar to the rotor assembly 57 except where shown in the drawings or described below. The rotor assembly 57-4 includes a rotor shaft 56-4 having an internal passageway 70-4 for accepting a first electrical connection 74-4 and at least one external groove for accepting a second electrical connection 76-4. In the illustrated example, the first and second electrical connections overlap with each other relative to a central longitudinal axis of the rotor shaft 56-4.

The first electrical connection 74-4 connects a plurality of windings 60-4 surrounding a rotor core 58-4 to a brush assembly 62-4. The brush assembly 62-4 includes a brush housing 80-4 at least partially enclosing a brush 82-4 for engaging a slip ring 84-4 fixed from rotating relative to the rotor shaft 56-4.

The second electrical connection 76-4 connects a radial brush assembly 110-4 to the plurality of windings 60-4. In the illustrated example, the radial brush assembly 110-3 is located radially outward from a radial slip ring 112-4 and includes a radial brush 113-4 fixed relative to a brush housing 114-4. The radial slip ring 112-4 also includes at least one radial connection 115-4 to connect with the second electrical connection 76-4.

Also, the first electrical connection 74-4 can include one or more jumpers 100A-4 extending between the plurality of windings 60-4 and the first electrical connection 74-4. The first and second electrical connections 74-4, 76-4 include varying axial lengths due to the use of the radial brush assembly 110-4 with a radial slip ring 112-4 fixed relative to the rotor shaft 56 on the same axial side of the plurality of windings. Therefore, a gauge of the wire used for the first and second electrical connections 74-4, 76-4 varies to accommodate for the varying internal resistance. For simplicity, the internal conduit is not illustrated with the first and second electrical connections 74-4 and 76-4.

Furthermore, a bearing 85-4, such as a roller bearing or ball bearing, can be located between the rotor shaft 56-4 and the brush housing 80-4 to mitigate bearing current. In particular, the bearing 85-4 can include conductive grease to facilitate grounding the rotor shaft 56-4 relative to a ground 120-4 through the brush housing 80-4. One feature of utilizing the bearing 85-4 is a reduction in friction when compared to a slip connection.

FIG. 9 schematically illustrates another example rotor assembly 57-5. The rotor assembly 57-5 is similar to the rotor assembly 57 except where shown in the drawings or described below. The rotor assembly 57-5 includes a rotor shaft 56-5 having internal passageways 70A-5 and 70B-5 for accepting a first electrical connection 74-5 and a second electrical connection 76-5, respectively.

The first electrical connection 74-5 connects a plurality of windings 60-5 surrounding a rotor core 58-5 to a brush assembly 62-5 on a first axial end of the rotor shaft 56-5. In the illustrated example, at least a portion of the first electrical connection 74-6 is located adjacent to an exterior of the rotor shaft 56-5.

The brush assemblies 62-5 include a brush housing 80-5 at least partially enclosing a brush 82-5 for engaging a slip ring 84-5 fixed from rotating relative to the rotor shaft 56-5. The brush assemblies 62-5 also include bearing current bypass brushes 118-5 located radially outward from the brushes 82-5. Bearing current bypass slip rings 116-5 are located radially outward from slip rings 84-5 for engaging the bearing current bypass brushes 118-5. The bearing current bypass brush 118-5 is attached to a brush housing 80-5 and connected to an electrical ground 120-5. The bearing current bypass brushes 118-5 ground the rotor shaft 56-5 to allow for circulating currents to be grounded to mitigate pitting and fluting of bearing 122-5. The brushes 118-5 provide a path of least resistance that does not include the bearings 122-5. Also, the brushes 118-5 at each axial end can include multiple brushes for improving grounding.

The second electrical connection 76-5 connects the plurality of windings 60-5 through another brush assembly 62-5 on a second axial end of the rotor shaft 56-5. In the illustrated example, the second electrical connection 76-5 is located in the internal passageway 70A-5.

In the illustrated example, the first and second electrical connections 74-5, 76-5 include varying axial lengths due to the rotor core 58-5 being spaced from the axial center of the rotor shaft 56-5. Therefore, a gauge of the wire used for the first and second electrical connections 74-5, 76-5 varies to accommodate for the varying internal resistance. For simplicity, the internal conduit is not illustrated with the first or second electrical connections 74-5, 76-5.

Figure 10:
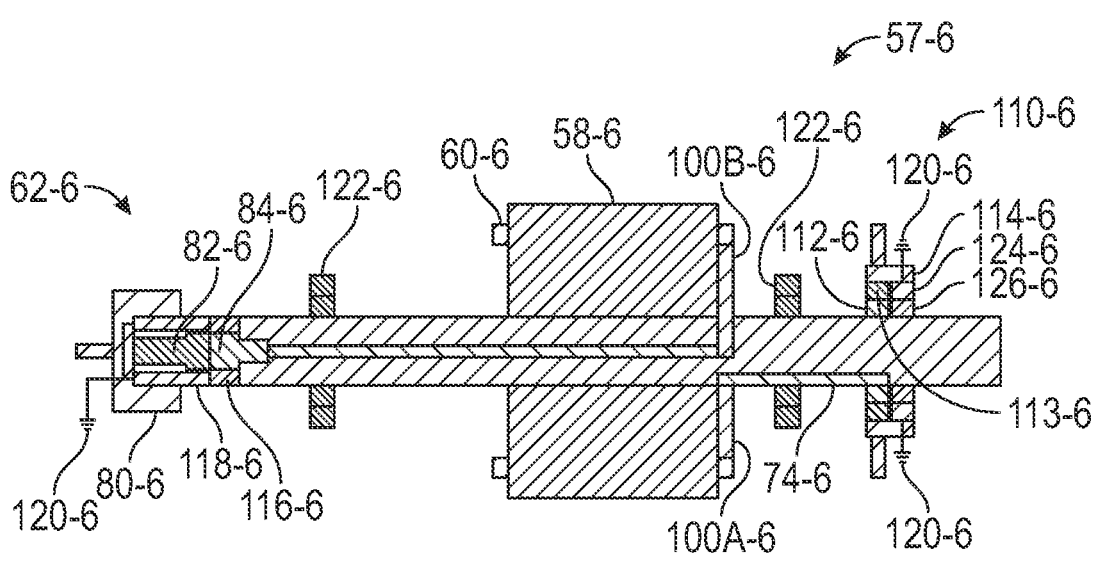
FIG. 10 schematically illustrates yet another example rotor assembly.

FIG. 10 schematically illustrates another example rotor assembly 57-6. The rotor assembly 57-6 is similar to the rotor assembly 57 except where shown in the drawings or described below. The rotor assembly 57-6 includes a rotor shaft 56-6 having a first electrical connection 74-6 and a second electrical connection 76-6 in electrical communication with a plurality of windings 60-6 on a rotor core 58-6 fixed relative to the rotor shaft 56-6. For simplicity, the internal conduit is not illustrated with the first or second electrical connections 74-6, 76-6.

In the illustrated example, at least a portion of the first electrical connection 74-6 is located adjacent to an exterior of the rotor shaft 56-6 for connecting a first radial brush assembly 110-6 with the plurality of windings 60-6. The radial brush assembly 110-6 is located radially outward from the radial slip ring 112-6 and includes a radial brush 113-6 fixed relative to a brush housing 114-6. A jumper 100A-6 connects the first electrical connection 74-6 and the plurality of windings 60-6.

The brush assemblies 62-6 include a brush housing 80-6 at least partially enclosing a brush 82-6 for engaging a slip ring 84-6 fixed from rotating relative to the rotor shaft 56-6. The brush assemblies 62-6 also include bearing current bypass brushes 118-6 located radially outward from the brushes 82-6. Bearing current bypass slip rings 116-6 are located radially outward from slip rings 84-6 for engaging the bearing current bypass brushes 118-6. The bearing current bypass brush 118-6 is attached to a brush housing 80-6 and connected to an electrical ground 120-6. The bearing current bypass brushes 118-6 ground the rotor shaft 56-6 to allow for circulating currents to be grounded to mitigate pitting and fluting of bearing 122-6. The brushes 118-6 provide a path of least resistance that does not include the bearings 122-6. Also, the brushes 118-6 at each axial end can include multiple brushes for improving grounding.

The radial brush assembly 110-6 also includes a radially outer bearing current bypass brush 124-6 that is axially aligned with a bearing current bypass slip ring 126-6 fixed relative to the rotor shaft 56-6. The bearing current bypass brush 124-6 is in electrical communication with an electrical ground 120-6 to ground the rotor shaft 56-6. This provides a path of least resistance that does not include the bearings 122-6.

The second electrical connection 76-6 connects the plurality of windings 60-6 surrounding the rotor core 58-6 to a brush assembly 62-5. The rotor shaft 56-6 includes an internal passageway 70-6 for accepting the second electrical connection 76-6 that connects a brush assembly 62-6 with the plurality of windings 60-6.

Figure 11:
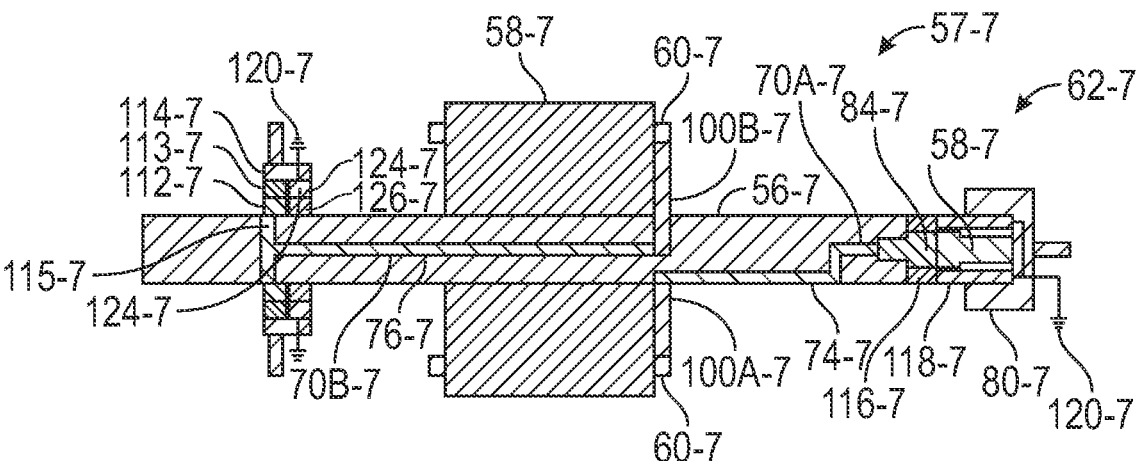
FIG. 11 schematically illustrates yet another example rotor assembly.

FIG. 11 schematically illustrates another example rotor assembly 57-7. The rotor assembly 57-7 is similar to the rotor assembly 57-7 except where shown in the drawings or described below. The rotor assembly 57-7 includes a rotor shaft 56-7 having a first electrical connection 74-7 and a second electrical connection 76-7 in electrical communication with a plurality of windings 60-7 surrounding a rotor core 58-7 fixed relative to the rotor shaft 56-7. For simplicity, the internal conduit is not illustrated with the first or second electrical connections 74-7, 76-7.

In the illustrated example, the second electrical connection 76-7 connects a radial brush assembly 110-7 with the plurality of windings 60-7. The rotor shaft 56-7 includes an internal passageway 70B-7 for accepting the second electrical connection 76-7 that connects the radial brush assembly 110-7 with the plurality of windings 60-7.

The radial brush assembly 110-7 is located radially outward from the radial slip ring 112-7 and includes a radial brush 113-7 fixed relative to a brush housing 114-7. The radial slip ring 112-7 also includes at least one radial connection 115-7 that connects to the second electrical connection 76-7.

The radial brush assembly 110-7 also includes a radially outer bearing current bypass brush 124-7 that is axially aligned with a bearing current bypass slip ring 126-7 fixed relative to the rotor shaft 56-7. The bearing current bypass brush 124-7 is in electrical communication with an electrical ground 120-7 to ground the rotor shaft 56-7. This provides a path of least resistance that avoids bearings 122-7.

The brush assemblies 62-7 include a brush housing 80-7 at least partially enclosing a brush 82-7 for engaging a slip ring 84-7 fixed from rotating relative to the rotor shaft 56-7. The brush assemblies 62-7 also include bearing current bypass brushes 118-7 located radially outward from the brushes 82-7. Bearing current bypass slip rings 116-7 are located radially outward from slip rings 84-7 for engaging the bearing current bypass brushes 118-7. The bearing current bypass brush 118-7 is attached to a brush housing 80-6 and connected to an electrical ground 120-7. The bearing current bypass brushes 118-7 ground the rotor shaft 56-7 to allow for circulating currents to be grounded to mitigate pitting and fluting of bearing 122-7. The brushes 118-7 provide a path of least resistance that does not include the bearings 122-7. Also, the brushes 118-7 at each axial end can include multiple brushes for improving grounding.

Figure 12:
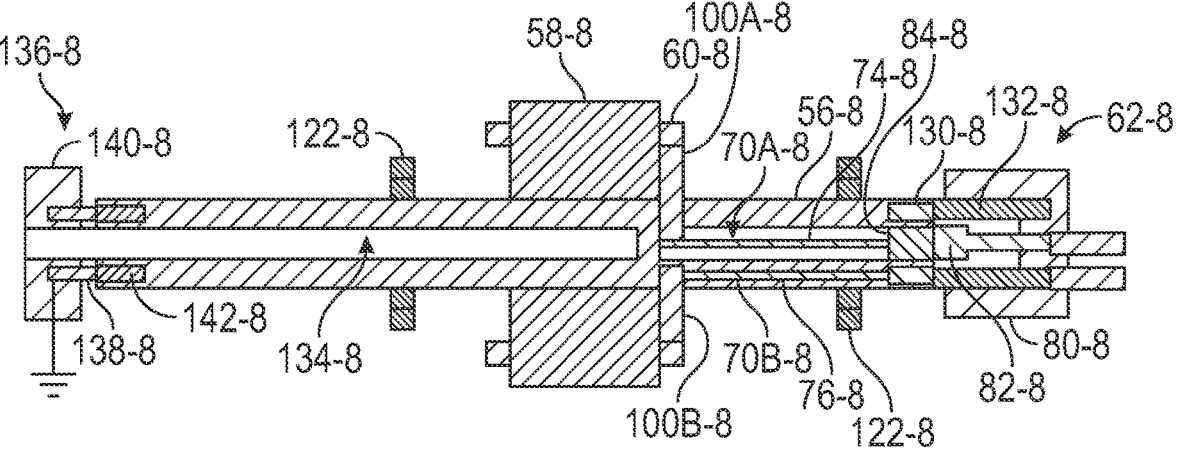
FIG. 12 schematically illustrates yet another example rotor assembly.

FIG. 12 schematically illustrates another example rotor assembly 57-8. The rotor assembly 57-8 is similar to the rotor assembly 57 except where shown in the drawings or described below. The rotor assembly 57-8 includes a rotor shaft 56-8 having a first electrical connection 74-8 and a second electrical connection 76-8 in electrical communication with a plurality of windings 60-8 on a rotor core 58-8 fixed relative to the rotor shaft 56-8. For simplicity, the internal conduit is not illustrated for the first or second electrical connections 74-8, 76-8.

In the illustrated example, the first electrical connection 74-8 extends along an internal passageway 70A-8 and connects with the plurality of windings 60-8 surrounds the rotor core 58-8 to a brush assembly 62-8 and at least one jumper 100A-8. The second electrical connection 76-8 extends through another passageway 70B-8 through the rotor shaft 56-8 and connects the plurality of windings 60-8 with the brush assembly 62-8 through at least one jumper 100B-8.

In the illustrated example, the brush assembly 62-8 includes a brush housing 80-8 at least partially enclosing a first brush 82-8 for engaging a first slip ring 84-8 fixed from rotating relative to the rotor shaft 56-8. The first brush 82-8 and the first slip ring 84-8 are in electrical communication with the first electrical connection 74-8.

The brush assembly 62-8 also includes a second brush 132-8 for engaging a second slip ring 130-8 located on the rotor shaft 56-8. The second brush 132-8 and the second slip ring 130-8 are in electrical communication with the second electrical connection 76-8. The first brush 82-8 and slip ring 84-8 are located radially inward from the second brush 132-8 and slip ring 132-8, respectively.

The rotor assembly 57-8 also includes a bearing current brush assembly 136-8. In the illustrated example, the bearing current brush assembly 136-8 includes at least one bearing current brush 138-8 fixed relative to a bearing current brush housing 140-8. The at least one bearing current brush 138-8 is engagement with a bearing current slip ring 142-8 fixed relative to the rotor shaft 56-8. The bearing current bypass brushes 138-8 ground the rotor shaft 56-8 to allow for circulating currents to bypass the bearings 122-8 to mitigate pitting and fluting of bearings 122-8.

Also, the rotor shaft 56-8 includes an internal cooling passageway 134-8 for cooling the rotor shaft during operation. In the illustrated example, the internal cooling passageway 134-8 is in the rotor shaft. The internal cooling passageway 134-8 extends through a central region of the current bearing brush housing 140-8 and is located radially inward from the at least one bearing current brush 138-8 and the least one bearing current slip ring 142-8.

The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characterization) described in connection with the aspect is included in at least one aspect described herein, and may or may not be present in other aspects. In addition, it is to be understood that the described elements may be combined in a suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

While the above disclosure has been described with reference to exemplary embodiments, it will be understood by those skilled in the art that various changes may be made, and equivalents may be substituted for elements thereof without departing from its scope. In addition, many modifications may be made to adapt a particular situation or material to the teachings of the disclosure without departing from the scope thereof. Therefore, it is intended that the present disclosure is not limited to the particular embodiments disclosed but will include embodiments falling within the scope thereof.

What is claimed is:

1. A rotor assembly for an electric machine comprising:
   a rotor shaft;
   a rotor core supported by the rotor shaft and surrounded by a plurality of windings;
   a first brush configured to engage a first slip ring fixed relative to a first distal end of the rotor shaft, wherein the first brush includes one of a first conical projection or a first convex receptacle and the first slip ring includes the other of the first conical projection or the first convex receptacle;
   a first bearing current bypass brush fixed relative to a first brush housing with the first bearing current bypass brush located radially outward from the first brush and a first bearing current bypass slip ring fixed relative to a first axial end of the rotor shaft and located radially outward of the first slip ring, wherein the first bearing current bypass brush is connected to an electrical ground;
   a first electrical connection extending between the first slip ring and the plurality of windings;
   a second brush configured to engage a second slip ring with the second slip ring fixed relative to the rotor shaft; and
   a second electrical connection extending between the second slip ring and the plurality of windings.

2. The assembly of claim 1, wherein the first brush is located in the first brush housing and the first brush is biased towards the first slip ring with a first spring element.

3. The assembly of claim 2, wherein the rotor shaft includes an internal passageway with at least one internal conduit configured to accept at least one of the first electrical connection or the second electrical connection.

4. The assembly of claim 3, wherein the at least one internal conduit is comprised of a non-conductive material.

5. The assembly of claim 1, wherein at least one of the first electrical connection and the second electrical connection include a plurality of connections to the plurality of windings.

6. The assembly of claim 1, wherein the second brush includes one of a second conical projection or a second convex receptacle configured to engage the other of the second conical projection or the second convex receptacle on the second slip ring and the second brush is located in a second brush housing and the second brush is biased towards the second slip ring with a second spring element.

7. The assembly of claim 1, wherein the second brush extends circumferentially, and the second slip ring extends circumferentially, and the second brush is located radially outward from the second slip ring.

8. The assembly of claim 7, wherein the first slip ring and the second slip ring are located on the same axial side of the rotor shaft relative to the rotor core.

9. The assembly of claim 7, wherein a wire gauge of the first electrical connection varies relative to a wire gauge of the second electrical connection.

10. The assembly of claim 7, wherein the second electrical connection includes a plurality of connections to the plurality of windings.

11. The assembly of claim 7, wherein one of the first or second electrical connections is located adjacent to an exterior of the rotor shaft and the other of the first or second electrical connections is located in an interior of the rotor shaft.

12. The assembly of claim 1, wherein the rotor shaft includes an internal cooling passageway, the second brush is located radially outward and at least partially axially aligned with the first brush, and the second slip ring is located axially outward and at least partially axially aligned with the second slip ring.

13. An electric machine comprising:
a stator having a plurality of stator windings;
a rotor shaft supporting a rotor core surrounded by a plurality of rotor windings;
a first brush configured to engage a first slip ring fixed relative to a first distal end of the rotor shaft, wherein the first brush includes one of a first conical projection or a first convex receptacle and the first slip ring includes the other of the first conical projection or the first convex receptacle;
a first bearing current bypass brush fixed relative to a first brush housing with the first bearing current bypass brush located radially outward from the first brush and a first bearing current bypass slip ring fixed relative to a first axial end of the rotor shaft and located radially outward of the first slip ring, wherein the first bearing current bypass brush is connected to an electrical ground;
a first electrical connection extending between the first slip ring and the plurality of rotor windings;
a second brush configured to engage a second slip ring with the second slip ring fixed relative to the rotor shaft; and
a second electrical connection extending between the second slip ring and the plurality of rotor windings.

14. The electric machine of claim 13, wherein the second brush includes one of a second conical projection or a second convex receptacle configured to engage the other of the second conical projection or the second convex receptacle on the second slip ring and the second brush is located in a second brush housing and the second brush is biased towards the second slip ring with a second spring element.

15. The electric machine of claim 13, wherein the second brush extends circumferentially, and the second slip ring extends circumferentially, and the second brush is located radially outward from the second slip ring.

16. The electric machine of claim 13, wherein the rotor shaft includes an internal cooling passageway, the second brush is located radially outward and at least partially axially aligned with the first brush, and the second slip ring is located axially outward and at least partially axially aligned with the second slip ring.

17. A vehicle comprising:
a body defining a passenger compartment;
an electric motor supported in the body, the electric motor including:
a stator having a plurality of stator windings;
a rotor shaft supporting a rotor core surrounded by a plurality of rotor windings;
a first brush configured to engage a first slip ring fixed relative to a first distal end of the rotor shaft, wherein the first brush includes one of a first conical projection or a first convex receptacle and the first slip ring includes the other of the first conical projection or the first convex receptacle;
a first bearing current bypass brush fixed relative to a first brush housing with the first bearing current bypass brush located radially outward from the first brush and a first bearing current bypass slip ring fixed relative to a first axial end of the rotor shaft and located radially outward of the first slip ring, wherein the first bearing current bypass brush is connected to an electrical ground;
a first electrical connection extending between the first slip ring and the plurality of rotor windings;
a second brush configured to engage a second slip ring with the second slip ring fixed relative to the rotor shaft; and
a second electrical connection extending between the second slip ring and the plurality of rotor windings.

18. The vehicle of claim 17, wherein the second brush includes one of a second conical projection or a second convex receptacle configured to engage the other of the second conical projection or the second convex receptacle on the second slip ring and the second brush is located in a second brush housing and the second brush is biased towards the second slip ring with a second spring element.

19. The vehicle of claim 18, wherein the rotor shaft includes an internal cooling passageway, the second brush is located radially outward and at least partially axially aligned with the first brush, and the second slip ring is located axially outward and at least partially axially aligned with the second slip ring.

20. The vehicle of claim 18, wherein the second brush extends circumferentially, and the second slip ring extends circumferentially, and the second brush is located radially outward from the second slip ring and one of the first or second electrical connections is located adjacent to an exterior of the rotor shaft and the other of the first or second electrical connections is located in an interior of the rotor shaft.

* * * * *